Feb. 21, 1950    C. E. TACK    2,498,625
ROTOR BRAKE
Filed Feb. 16, 1945    3 Sheets-Sheet 1

INVENTOR.
Carl E. Tack
BY
Atty.

Feb. 21, 1950 — C. E. TACK — 2,498,625
ROTOR BRAKE
Filed Feb. 16, 1945 — 3 Sheets-Sheet 3

INVENTOR.
Carl E. Tack
BY
Owen O. B. Garner
Atty.

Patented Feb. 21, 1950

2,498,625

UNITED STATES PATENT OFFICE 2,498,625

ROTOR BRAKE

Carl E. Tack, Chicago, Ill., assignor to American Steel Foundries, Chicago, Ill., a corporation of New Jersey Application February 16, 1945, Serial No. 578,233

3 Claims. (Cl. 188—59)

My invention relates to a brake arrangement for a railway car truck and more particularly to a brake design commonly called off-wheel, wherein brake discs or rotors are supported to rotate with the wheel and axle assembly to afford braking surfaces engageable with brake shoes for braking the rotating wheel and axle assembly.

The present invention is directed primarily to an improvement over the type of brake described and illustrated in my Patent No. 2,355,120, issued August 8, 1944. The said patent illustrates a rotor brake arrangement such as that described wherein the brake shoes associated with each disc are actuated into engagement with the braking surfaces thereof by brake levers fulcrumed from the brake frame and operatively connected to links forming a toggle connection therebetween, a hand brake lever engaging the links at the pivot of the toggle and actuating said brake levers for urging the associated brake shoes into said engagement.

A specific object of my invention is to provide in a brake of the type described a simplified hand brake arrangement having means for actuating the brake shoes in such manner as to assure uniform brake shoe loads regardless of the amount of travel required by the shoes for braking application and which will supply substantially equal pressure to the shoes irrespective of the wear on the shoes.

These objects are attained by the use of an equalizer pivotally mounted on the hand brake lever and adapted to have engagement at each end thereof with a projection on each brake lever for effecting braking application of the shoes upon actuation of the hand brake lever.

In the drawings, Figure 1 is a top plan view of a railway car truck embodying my invention, only one end of the truck being shown inasmuch as it is similar at opposite ends thereof, and the brake frame being partly shown in section to illustrate my novel hand brake means.

Figures 4 and 5 are views of my novel equalizer member, Figure 4 being a top plan view, and Figure 5 being a side view looking toward the right of Figure 4.

Figure 1:
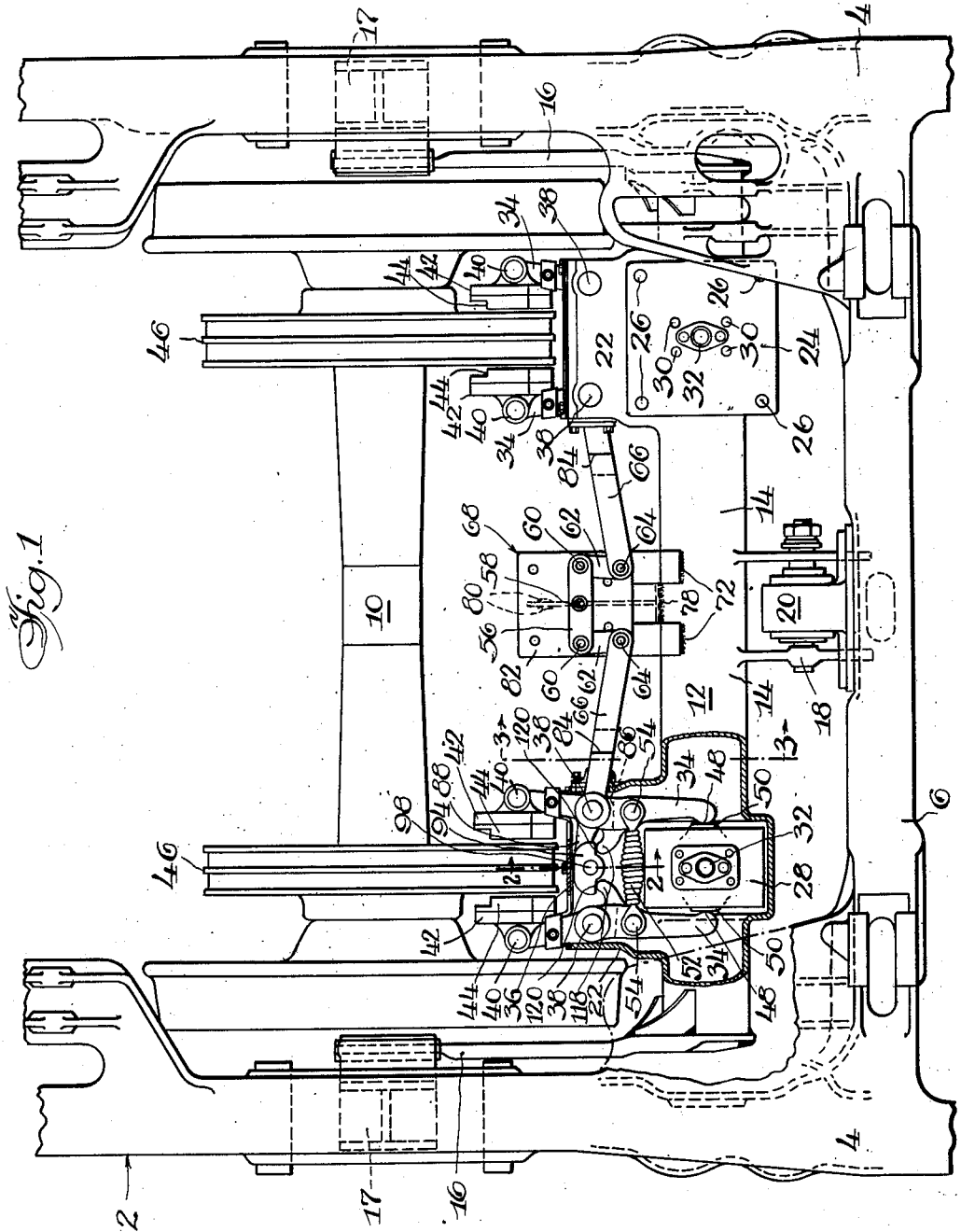

Describing my invention in detail and referring first to Figure 1 of the drawings, the truck is substantially identical with that illustrated and described in said patent. The truck frame generally designated 2 is of well known form and comprises the spaced side frame members 4, 4 and an end rail (not shown) at each end of the truck and a transom 6 at each side of the transverse center line of the truck and connecting the side frame members 4, 4, said transoms normally supporting therebetween a car body bolster (not shown).

Each side frame 4 may have at opposite ends thereof journal boxes (not shown) serving as the usual means of connection to the adjacent wheel and axle assembly 10, and the frame structure also comprises at each side thereof an equalizer (not shown) supported in the usual manner from the journal boxes, the detail of the support means being more fully described in the before-mentioned patent.

The brake frame generally designated 12 may be supported at each end of the truck structure, each brake frame 12 comprising the transverse beam 14 of tubular form with torque arms 16, 16 integrally formed therewith at opposite ends thereof to define a C frame. The extremity of each torque arm 16 may be resiliently supported from an adjacent journal box as at 17, and the intermediate portion of the beam 16 may be pivotally connected as at 18 to the torque bracket 20 secured on the adjacent transom in a manner identical with that described and shown in the before-mentioned patent.

The tubular brake frame member is formed adjacent each end thereof with an enlarged portion or housing 22 having an open top closed by the cover plate 24 which may be secured thereto as at 26, 26. Each cover plate 24 may serve as a carrier for the associated power means 28 comprising a double-acting cylinder which may be secured as at 30, 30 to the cover plate 24, said cylinder having a nipple 32 projecting through the cover plate and serving as a means of connection to an air line (not shown).

The housing 22 may extend toward the adjacent axle and serve as an enclosure for the associated pair of brake levers 34, 34 which project from said housing, the adjacent end of the housing being closed by a dust cover 36. The levers 34, 34 are substantially identical with those shown and described in my patent and are fulcrumed from the housing 22 by means of pivot pins 38, 38 extending through the associated lever and the top and bottom walls of the associated housing 22, said levers pivotally supporting at their outer extremities as at 40, 40, the brake heads 42, 42 with their associated brake shoes 44, 44 arranged for frictional engagement with the opposite sides of the adjacent brake rotor 46 which may be secured to the hub of the adjacent wheel in any convenient manner. Each brake head 42 may have associated therewith balance means generally indicated at 47 and more particularly described in the before-mentioned patent for maintaining the brake head in its properly adjusted position on the associated lever 34 at all times. The ends of the brake levers 34, 34 adjacent the cylinder 28 may be formed with arcuate raised pads for abutment as at 48, 48 with pistons 50, 50 at the opposite ends of the cylinder 28, said cylinder thus serving as actuating means for said levers. A tension spring 52, having the opposite ends thereof connected as at 54, 54 to the respective levers, operates to release the levers and thereby the shoes associated therewith from the braking surfaces of the rotor 46.

Figure 6:
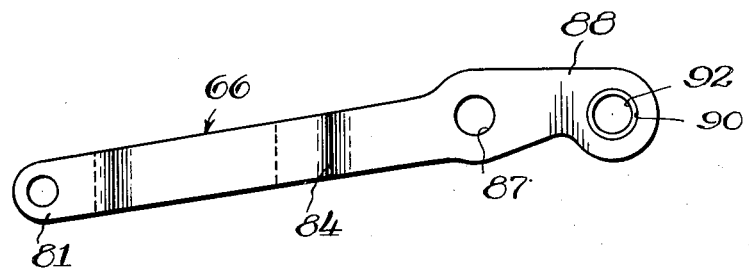
Figures 6 and 7 are views of my novel actuating lever, Figure 6 being a top plan view thereof, and Figure 7 being a side view.
Figure 7:
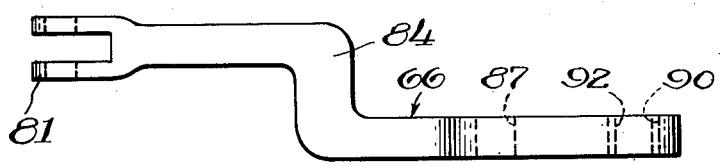

My novel hand brake structure for actuating the shoes associated with each wheel into braking engagement with the braking surfaces of the rotor, and to which the present invention is primarily directed, comprises an equalizer bar 56 pivotally connected centrally thereof as at 58 to hand brake operating means (not shown), said bar having jaw ends which may be pivotally connected as at 60, 60 to links 62, 62 which are in turn pivotally connected as at 64, 64 to the hand brake actuating levers 66, 66. The actuating levers, one of which is shown in Figures 6 and 7, are fulcrumed at the respective pivot points 38, 38 to the adjacent power actuated levers 34, 34 as hereinafter described. The central portion of the hand brake structure is supported by a bracket assembly generally designated 68 comprising the horizontal top plate 70 which may be welded as at 72 to the beam 14 and a downwardly directed flange 74 welded with the vertical rib 76 as at 78 to the beam 14, the opposite end of the rib being welded as at 80 to the horizontal plate 70. The equalizer bar 56 and the adjacent jaw ends 81 of the levers 66 with their connecting links are slidably supported on a wear plate 82 mounted on the plate 70.

Figure 2:
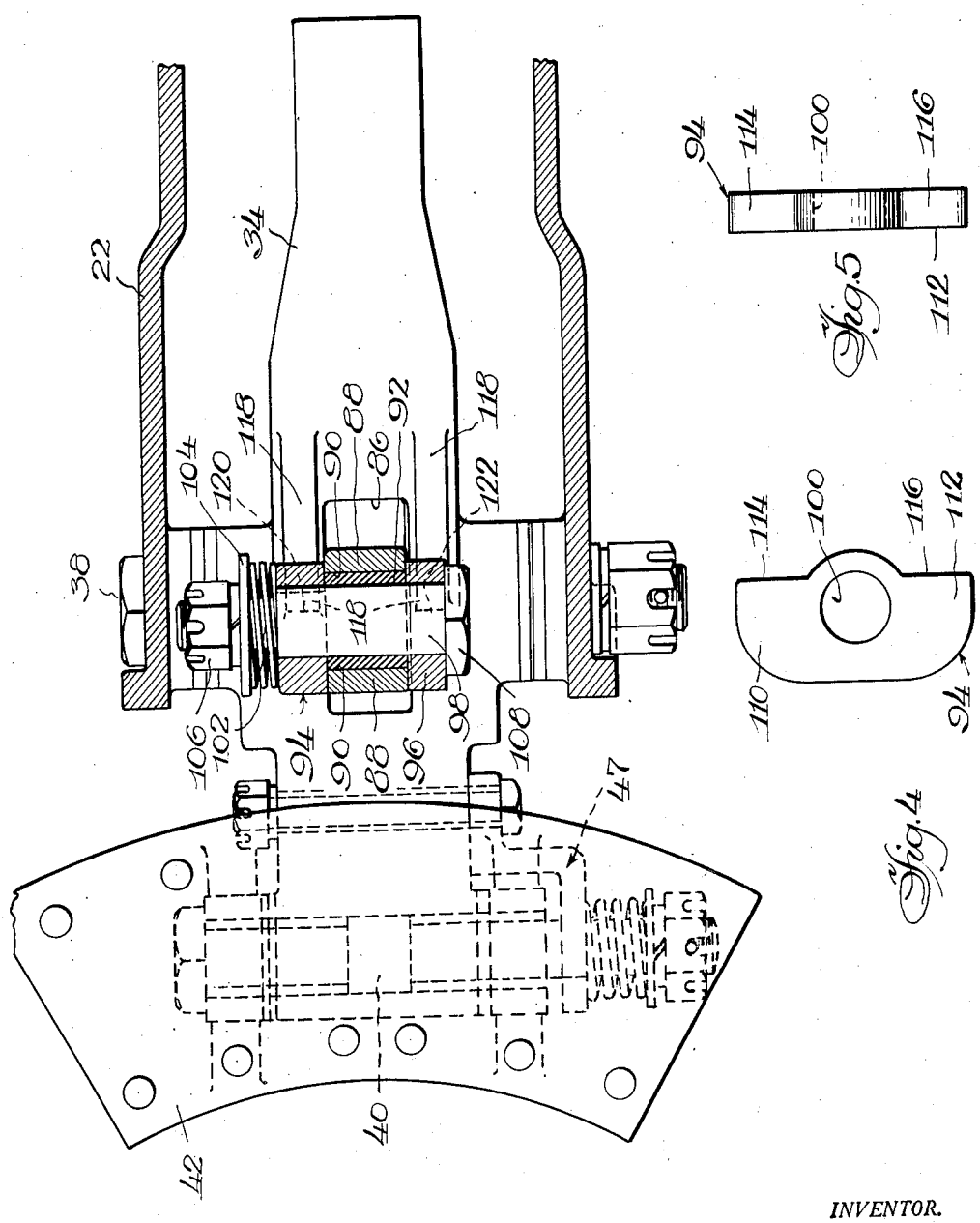
Figure 2 is a fragmentary sectional view of the brake frame and brake parts, said section being taken substantially in the transverse plane indicated by the line 2—2 of Figure 1.
Figure 3:
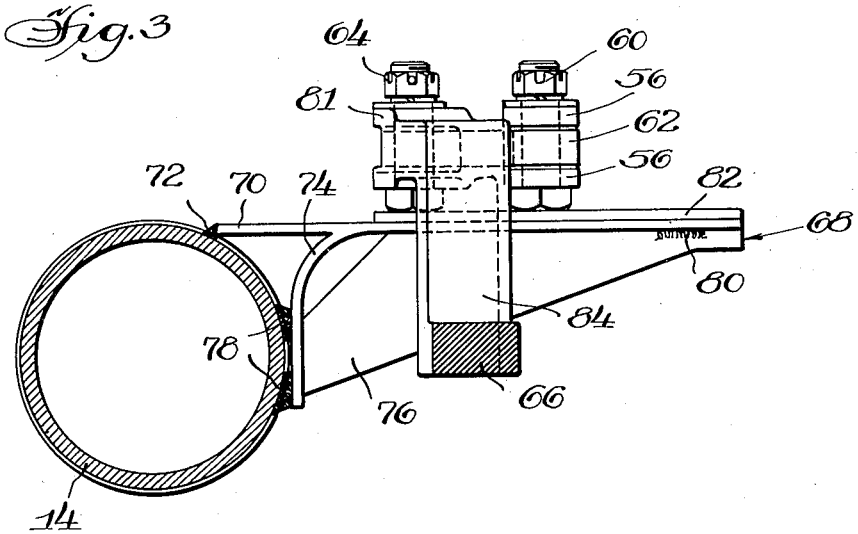
Figure 3 is a fragmentary sectional view through the brake frame shown in Figure 1 illustrating the support for the hand brake means, said section being taken in the plane indicated by the line 3—3 of Figure 1.

Each actuating lever 66, one of which is shown in Figures 6 and 7, may be offset downwardly as at 84 and may project through a central elongated slot 86 (Figure 2) formed in the adjacent lever 34 and extending transversely of the opening therein receiving the pivot pin 38, said lever 66 having an opening 87 therein through which the pivot pin 38 extends. The end portion 88 of each lever 66 extends within the associated housing and between the levers 34 and is provided with an annular opening 90 therethrough receiving a bushing 92. To insure that the brake shoes will always be applied with equal pressure to the respective braking faces of the rotor there may be positioned on opposite sides of the end portion 88 identical equalizer members 94 and 96 pivotally secured thereto by a pin 98 passing through aligned openings 100 in the same and the bushing 92 in the end portion 88, said members 94 and 96 being restrained against free rotation about the pin 98 by a spring 102 interposed between the member 94 and a washer 104 and urged into engagement therewith by a nut 106 threaded on the pin 98, the reaction of said spring causing the head 108 of the pin to urge the member 96 into engagement with the end portion 88.

Each of the identical equalizer members 94 and 96, one of which is shown in Figures 4 and 5, is a substantially semi-circular plate comprising the wing portions 110 and 112 with aligned plane surfaces 114 and 116 respectively abutting one of the pairs of spaced projections or arms 118 on each of the adjacent brake levers 34 in alignment therewith. As shown in Figure 1, the spaced projections 118 on each lever are similarly arcuately formed in spaced relation to each other with the end of the upper projection on respective levers having engagement as at 120 with the surfaces 114 and 116 on the adjacent equalizer member 94 and the end of the lower projection on respective levers having engagement as at 122 with the surfaces 114 and 116 on the adjacent equalizer member 96.

It will be readily understood by those skilled in the art that application of power to the equalizer bar 56 will simultaneously rotate the actuating levers 66, 66 about their respective pivot points 38, 38 whereby power will be applied from each lever 66 by means of the associated equalizers 94 and 96 to the spaced projections 118 on the associated power levers 34, 34 for operating the same in a manner similar to that in which they are normally operated by the associated power means 28.

It will also be apparent that in the event unequal wear of the brake shoes associated with each rotor occurs, the equalizer members 94 and 96 on the associated actuating lever 66 will rotate about the pin 98 upon engagement of the respective surfaces 114 and 116 thereof with the spaced arms 118 of the associated levers 34, 34 to an extent insuring the equal application of actuating forces thereto with the result that the brake shoes carried by the levers 34, 34 will be applied with substantially equal pressure to the braking faces of the rotor 46 regardless of the wear on the shoes or the amount of travel required by the shoes for said braking application.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway brake arrangement for a railway car truck comprising a wheel and axle assembly including a pair of brake surfaces, and a truck frame structure supported by said assembly; the combination of a brake frame supported by said truck, a pair of brake levers fulcrumed to said frame, brake means carried by said levers for braking respective surfaces, a slot through one of said levers, spaced arms on said one lever above and below said slot respectively, spaced arms on the other lever aligned with respective arms of said one lever, an actuating lever projecting through said slot, and spaced equalizers each engaging one arm only of each brake lever, said actuating lever extending between said equalizers and affording the sole means of support therefor, a bolt extending through said equalizers and said actuating lever to afford a pivotal connection therebetween, said bolt having a portion bearing against a friction surface on one equalizer, and a compressed spring carried by said bolt and reacting against the other equalizer whereby said equalizers are resiliently clamped on said actuating lever and are maintained in alignment with the related arms.

2. A brake arrangement for a railway car truck having a wheel and axle assembly, said arrangement comprising a brake support carried by said truck adjacent said assembly, brake levers pivoted to said support, brake means operatively associated with said levers for decelerating rotation of said assembly, and actuating means for said levers comprising a pair of equalizers therebetween, a pair of spaced arms on each lever engaged with respective equalizers, an actuator extending between and suppporting the equalizers, a pivot element pivotally interconnecting the equalizers to the actuator, and spring means carried by the element for frictionally clamping the equalizers against the actuator and maintaining the equalizers in alignment with the related arms.

3. In a brake arrangement for a railway car truck having a wheel and axle assembly including a rotatable brake member, and having a truck structure supported by said assembly; the combination of a brake frame supported by said structure, spaced brake levers pivoted to the brake frame and carrying friction means for braking opposite sides of said member, a substantially horizontal slot through one of said levers, an actuator extending through said slot, and an operative connection between said actuator and said levers comprising spaced top and bottom arms on each brake lever intermediate the ends thereof, spaced top and bottom equalizer members bearing respectively against the top and bottom of said actuator and entirely supported thereby, a pin pivotally connecting the equalizer members to the actuator for relative pivotal movement on a substantially vertical axis, the top equalizer member bearing against the top arms of the respective brake levers and the bottom equalizer member bearing against the bottom arms of respective brake levers, and resilient means carried by said pin for frictionally engaging said equalizer members with said actuator and maintaining the equalizer members in alignment with the related arms.

CARL E. TACK.

REFERENCES CITED

The following references are of record in the file of this patent:

UNITED STATES PATENTS

| Number | Name | Date |
| --- | --- | --- |
| 1,169,920 | Brown | Feb. 1, 1916 |
| 1,379,111 | Lucand | May 24, 1921 |
| 2,113,350 | Kessen | Apr. 5, 1938 |
| 2,355,120 | Tack | Aug. 8, 1944 |
| 2,359,788 | Pierce | Oct. 10, 1944 |